Nov. 24, 1936.                J. BIREK                2,061,750
ARTIFICIAL GRASS MAT
Filed Aug. 13, 1936

INVENTOR.
JOHN BIREK.
BY
ATTORNEY.

Patented Nov. 24, 1936

2,061,750

UNITED STATES PATENT OFFICE 2,061,750

ARTIFICIAL GRASS MAT

John Birek, Cleveland, Ohio, assignor to Saul I. Fineman, Cleveland, Ohio

Application August 13, 1936, Serial No. 95,874

2 Claims. (Cl. 112—1)

This invention relates to artificial grass mats such as are used for decorating purposes and to the methods for making them.

Heretofore, it has been proposed to make artificial grass mats by securing upon a base of fabric or other flexible sheet material, pieces or strips of dried grass, raffia or the like.

It is desirable in making such grass mats to sew the fibers or strips of the grass simulating material to the base in such manner that some of the pieces of the grass will stand up from the base in a manner to simulate the growing grass and that others shall lie flat on the base to conceal it, especially at such times as it is folded or bent in use, since this causes the upstanding pieces to diverge from each other and expose the underlying base.

Various methods have been devised to accomplish these results. In some, strips or fibers are secured upon the base in a plurality of layers, a first layer to cover the fabric of the base and other layers disposed thereon to provide the upstanding grass simulating parts. Such multiple layer methods are, of course, expensive to practice.

In other methods, the strips of grass material are laid in a row across the base and secured thereto by a row of stitching through the middle of the strip; and the stitch row of the next adjacent similarly applied row of strips sews down one end of the preceding row. Thus, one half of the strip is sewn flat to the base and the other half stands up from it. In this method, difficulty is encountered and care must be exercised to "catch" the ends of the strips in one row by the stitching of the next row.

At best, as a result of this method, the upstanding grass blades are disposed in clearly defined rows with flat lying grass therebetween and the result is "set" and artificial and does not sufficiently simulate grass. And for a given number of blades or pieces of the artificial grass which must be handled in the process, the upstanding grass simulating ends are too sparse, since only one end of each piece of grass stands up, the other end being sewn down to the base.

In the method of this invention, the artificial grass is put on the base in a single layer or passage over the base, and the strips of grass are laid on the base and sewn thereto in such manner that not only is the base covered by pieces lying flat thereon, but both ends of pieces of the grass stand up from the base to simulate growing grass. The maximum of upstanding grass ends and the maximum of base coverage as well as the minimum of operations in sewing the grass to the fabric is therefore provided for the minimum of pieces handled.

It is therefore an object of this invention to provide an improved artificial grass mat of the class referred to.

Another object is to provide an improved method for making artificial grass mats of the class referred to.

Another object is to provide, for making grass mats of the type comprising a fabric or like base upon which pieces of raffia, dried grass, etc., are sewn, an improved method whereby for a given amount of the grass material, the maximum number of upstanding grass simulating ends and the maximum coverage of the fabric by flat lying portions thereof may be effected.

Another object is to provide an improved method for making artificial grass mats of the class referred to whereby the fabric or like base of the mat may be substantially completely covered by flat lying and upstanding portions of grass simulating material and in a single layer upon the base.

Other objects will be apparent to those skilled in the art to which my invention appertains. My invention is fully disclosed in the following description, taken in connection with the accompanying drawing in which.

Figure 1:
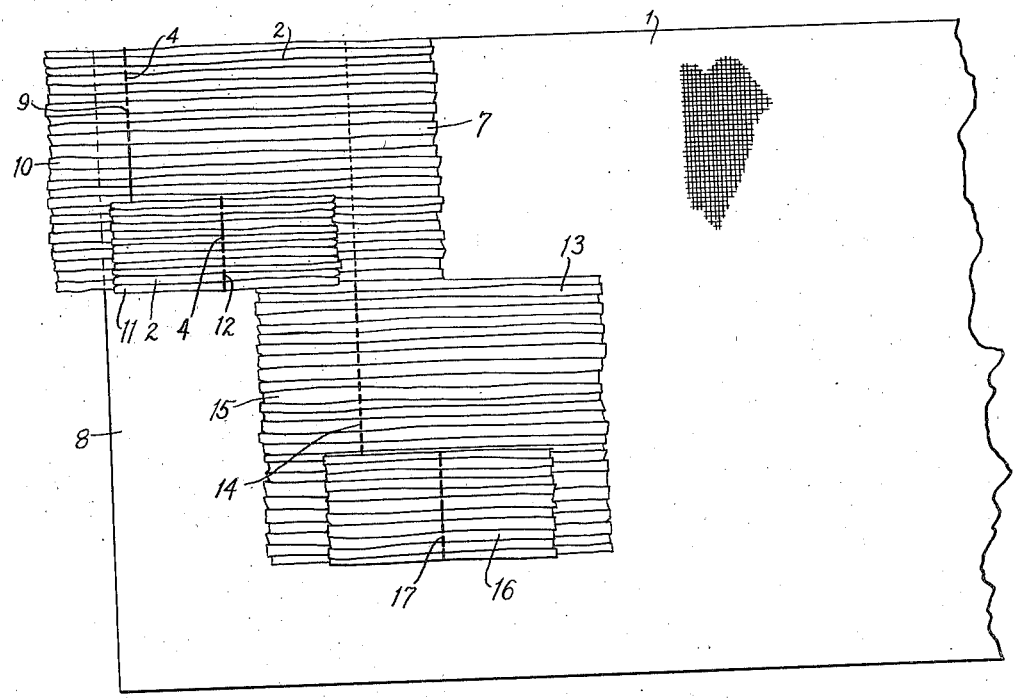
Fig. 1 is a plan view to an enlarged scale of a part of a grass mat embodying my invention in one form.

Referring now to the drawing, I have shown at 1 a fragmentary section of a base upon which strips of raffia, dried grass, fibers or other pieces of grass simulating material 2—2 are sewn by stitching 4—4. The base may be made from fabric or other flexible sheet material suitable for the purpose.

Hereinafter the grass simulating material will be referred to as raffia strips or pieces but it is to be borne in mind that other kinds of material may be used for this purpose.

Figure 2:
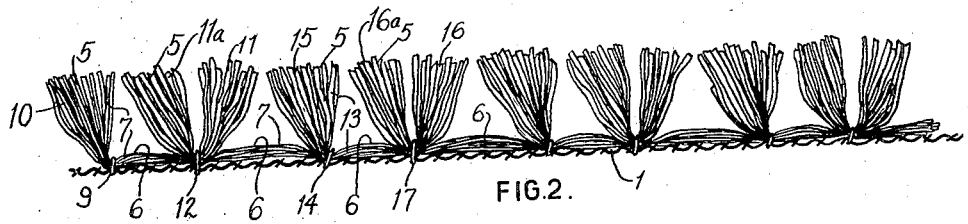
Fig. 2 is a side sectional view of a mat made according to the process illustrated in Fig. 1.

As will be observed in Fig. 2, free ends of the raffia strips project upwardly therefrom as at 5—5 and simulate upstanding growing grass and other portions of the raffia strips as at 6—6 lie flat upon the base 1 and are secured thereto to cover the same. To produce a mat having the cross-sectional appearance shown in Fig. 2, I prefer to proceed as follows:

I first provide a supply of raffia strips in two lengths. I then lay a row of such strips indicated at 7 across the end 8 of the base and sew them thereon by a row of stitching 9 adjacent one end, leaving an end portion 10 free to project upwardly from the base.

I then take raffia strips of the shorter length and lay them on top of the first laid row of strip 7 as shown at 11 with the mid-portions of the strips spaced toward the right from the row of stitching 9 and then I sew them through the middle thereof through the strips themselves and through the strips 7 already secured to the base by a row of stitching 12. Both ends of these fibers or strips 11 may thus stand upwardly from the base and it will be observed that a part of the strips 7 between the stitching rows 9 and 12 are secured to the base at spaced points of the strips.

I then take another group of the longer strips, shown at 13 and sew them to the base by a row of stitching 14 at a distance from their ends leaving free portion 15 which may stand upwardly from the base, the stitching being spaced from the stitched row 12 and passing through the strips 7. I then take another group of short strips 16 and by means of a row of stitching 17 sew their middle portions to the base through the strips 13 leaving both ends upstanding and proceed in this manner progressively across the base 1 until it is entirely covered by a layer of raffia strips.

It will be observed that the long strips such as 7 and 13 are sewed to the base at three points, for example, at 9, 12 and 14 for the strips 7; and that the long strips as well as the short strips both provide upstanding portions, the long strips providing one upstanding portion such as 10, 15, etc., and the short strips providing two upstanding portions, such as 11, 11a, 16, 16a.

Figure 3:
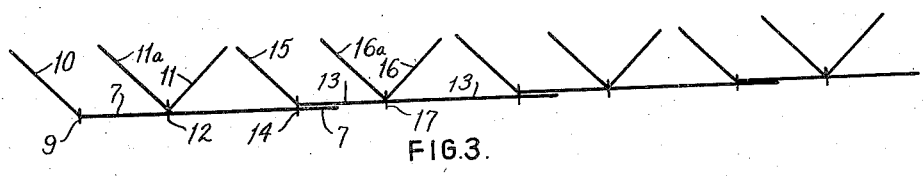
Fig. 3 is a view similar to Fig. 2 but of diagrammatic character.

The process is shown diagrammatically in Fig. 3 in connection with the above description and the actual appearance is more like that shown in Fig. 2 since the free ends of the long and the short strips spread out and effectively provide a solid mass of upstanding ends.

Figure 4:
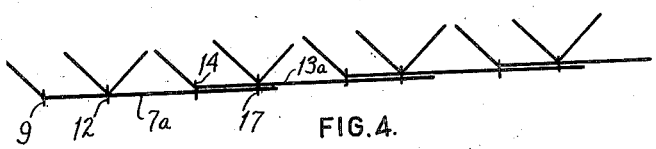
Figs. 4 and 5 are views similar to Fig. 3 showing modifications.

If preferred, the long strips 7, 13, etc., may be still longer as shown at 7a, 13a, etc., in Fig. 4 so that they will be secured to the base not only by the stitches 9, 12 and 14 but also by the stitches 17.

Figure 5:
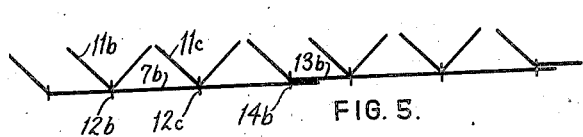

Also the strips 7, 13, etc., may be made longer as shown at 7b, 13b, etc., in Fig. 5, so that two rows of strips sewed at their middle, such for example as the set of strips 11b and 11c may be sewed through the long strips 7b by the stitching 12b, 12c and the long strips may be secured by these stitched rows as well as by the stitching 14b which secures the next row of long strips. Thus, as will be apparent, the underlying principle of my invention may be embodied in various different structures and by different processes but in all the modifications illustrated it will be observed that the long strips are long enough to be sewed to the fabric base at a plurality of spaced points but that only one row of stitching, for example that at 9 for the long strips 7 is provided especially for securing the long strips; the other rows of stitching through the long strips being provided for respectively sewing down short strips by their middle and for sewing down the next successive long strips.

I claim:

1. The method of making an artificial grass mat which includes laying a row of parallel relatively long strips of dried grass or like material across a fabric or like base and sewing them to the base by a row of stitching spaced from one end of the strips allowing the end portions thereof to stand up and simulate grass, then laying a row of shorter strips on the long strips and sewing them to the base by a second row of stitching between their ends and through intermediate portions of the long strips leaving both end portions of the short strips to stand up and simulate grass, the said second stitched row passing through an intermediate portion of the long strips, then laying a third row of relatively long strips on the base in overlapping relation to the opposite end portions of the first row of strips and sewing them to the base by a row of stitching passing through said overlapped ends of the first row and through the third row of strips at points spaced from the ends of the strips to leave upstanding end portions, and so on until the base is progressively entirely covered.

2. An artificial grass mat comprising a base of fabric or like flexible material and strips of raffia or like grass simulating material laid thereon in rows of parallel long strips and rows of parallel short strips and secured to the base by rows of stitching therethrough, the arrangement being such that one row of long strips is sewn to the base by a row of stitching passing through the strips at points spaced from their ends to leave the ends free to stand up and simulate grass and through the ends of the strips of the next preceding row of long strips, and a row of relatively short strips is sewn to the base upon each row of long strips by a row of stitching passing through the short strips intermediate their ends to leave both end portions thereof upstanding to simulate grass and through intermediate portions of the underlying relatively long strips.

JOHN BIREK.